United States Patent [19]
Rasmussen

[11] 3,821,212
[45] June 28, 1974

[54] 3,4-DIHYDRO-1-METHYL-11H-1,4-OXAZINO(4,3-B)-1,2-BENZOTHIAZIN-11-ONE 6,6-DIOXIDE

[75] Inventor: Chris Royce Rasmussen, Ambler, Pa.

[73] Assignee: McNeil Laboratories, Inc., Fort Washington, Pa.

[22] Filed: Oct. 2, 1972

[21] Appl. No.: 294,118

[52] U.S. Cl............ 260/243 R, 260/45.8, 252/300, 117/33.3
[51] Int. Cl............................................. C07d 93/02

[58] Field of Search .................................. 260/243 R

[56] References Cited
UNITED STATES PATENTS
3,408,347  10/1968  Shavel et al. ....................... 260/243

*Primary Examiner*—John M. Ford
*Attorney, Agent, or Firm*—Salvatore R. Conte

[57] ABSTRACT

The compound herein is 3,4-dihydro-1-methyl-11H-1,4-oxazino[4,3-b]-1,2-benzothiazin-11-one 6,6-dioxide, useful for its ultra-violet absorbing properties.

1 Claim, No Drawings